Patented May 23, 1933

1,910,331

UNITED STATES PATENT OFFICE

PAUL HALBIG, OF MUNICH, GERMANY, ASSIGNOR TO DR. ALEXANDER WACKER GESELLSCHAFT FUR ELEKTROCHEMISCHE INDUSTRIE, OF MUNICH, GERMANY, A CORPORATION

PROCESS OF PREPARING ALKALI METAL ALIPHATIC MONOHYDROXY ALCOHOLATES

No Drawing. Application filed November 23, 1931, Serial No. 576,949, and in Germany June 24, 1931.

This invention relates to a process of preparing alkali metal aliphatic monohydroxy alcoholates and more particularly to a process of preparing alkali metal aliphatic monohydroxy alcoholates containing no free alkali.

It is known that alcoholates may be formed by distilling an alcohol and an alkali according to the reaction

where R is an alkyl radical and $R_1$ is an alkali metal. With water soluble alcohols, auxiliary liquids such as benzine, benzene, etc. are sometimes used to effect a separation of the water. This problem was first and principally solved by Walker 1921, who described the manufacture of sodium alcoholate from sodium hydroxide and alcohol by azeotropic distillation of the reaction-water in the presence of benzol as an auxiliary liquid. Although many specifications have since been published, and patents dealing with this process, it still has been found that no remarkable improvement could be found over Walker's process, though it was known that the process of Walker does not allow an economic manufacture of alcoholates. The complete removal of the water is very difficult and necessitates great expenditure of heat and a well operating and carefully attended fractionation equipment.

The complete conversion of the caustic alkalies into alcoholate becomes more difficult as the conversion progresses and this condition is especially disadvantageous since alkali free products are essential for various uses, and even a limited amount of free alkali is capable of producing undesired secondary reactions.

I have now found that an alkali can be completely converted into an alcoholate and that the process can be carried out quickly, cheaply and continuously with comparatively simple apparatus.

According to this invention, a stream of a solution of an alkali in an alcohol is brought into contact in a column or tower with a counter stream of the alcohol vapor eventually in the presence of auxiliary liquids, forming an alkali metal aliphatic monohydroxy alcoholate containing no free alkali.

Liquids which form an azeotropic mixture with water or with water and alcohol and which, under the given conditions are incapable of reacting with the alcohol or the alcoholate, will be particularly useful in separating the alcohol and water, if a water soluble alcohol is used in the reaction. Examples of such are hydrocarbons, such as benzene, benzine, and the like, unhydrolyzable ethers, etc.

According to the preferred form of this invention, a solution of the alkali and alcohol and, if required, an auxiliary liquid is fed at the top of the column, flows through the column and reacts with a counter stream of alcohol vapor arising from the lower part of the column. An alkali metal aliphatic monohydroxy alcoholate solution containing no free alkali settles to the bottom of the column, and the vapors arriving at the top of the column are condensed, and the alcohol, or the alcohol and the auxiliary liquid, are separated from the water and may be used again in the reaction.

The following examples illustrate this invention, but the invention is not to be limited to these specific examples:

Example I

The lower part of a perforated plate or bubble cap plate column 6000 mm. high and 300 mm. in diameter, is charged with water-free ethyl alcohol and a small amount of benzene or with a mixture of alcohol and an ethylate solution and eventually with benzene. The major part of the column is charged with a quantity of benzene or benzine and alcohol sufficient to the formation of a ternary mixture of alcohol-water-benzene. About 20 liters of an alcohol solution containing 7 to 10% sodium hydroxide and, if desired, a small amount of benzene, is fed into the column about 600 mm. below the column head. The temperature is so regulated that about 60 liters per hour of a ternary mixture of alcohol-water-benzene passes over. This distillate has a boiling point of 64° C., is turbid, and separates into layers. The lower watery layer is separated. The upper alcohol-benzene layer may be returned to the column, or first, any undesired components may be removed in the well known manner. The lower watery layer contains some alcohol and benzene and may be worked up and restored to the cycle. The sodium ethylate solution at the bottom of the column can be continuously withdrawn and contains no free sodium hydroxide.

*Example II*

For the preparation of sodium butylate, the process of Example I is repeated without using the auxiliary liquid. About 50 liters of a butyl alcohol solution containing 10% sodium hydroxide are fed in hourly and the temperature is so regulated that about 70 liters of butyl alcohol-water distill over per hour. The distillated mixture boils at 90° C. The distillate separates into two layers of which the lower layer consists essentially of water and the upper layer of butyl alcohol. The sodium butylate in the lower part of the column contains no free sodium hydroxide.

*Example III*

Potassium butylate may be prepared according to Example II by substituting potassium hydroxide for the sodium hydroxide.

In a similar manner, other alkali metal aliphatic monohydroxy alcoholates may be prepared. In many cases the use of higher or lower pressure will be profitable; the proportion of the volatile constituents may thereby be influenced and the heat consumption lessened.

According to this invention, in contrast with the known processes, the same yield can be obtained in an unexpectedly favorable manner in considerably shorter time, with the production of a pure product and complete conversion of the alkali. The heat consumption is considerably less important than with the process used up to date.

It is understood that wherever sodium appears in the claims, potassium is also included.

What is claimed is:

1. Process of preparing an alkali metal aliphatic monohydroxy alcoholate, comprising treating a stream of an aliphatic monohydroxy alcoholic solution of alkali with a counter stream of aliphatic monohydroxy alcohol vapor.

2. Process of preparing an alkali metal aliphatic monohydroxy alcoholate, comprising treating a downward stream of an aliphatic monohydroxy alcoholic solution of alkali with an upward stream of aliphatic monohydroxy alcohol vapor.

3. Process of preparing an alkali metal aliphatic monohydroxy alcoholate, comprising treating in a column a stream of an aliphatic monohydroxy alcoholic solution of alkali with a counter stream of aliphatic monohydroxy alcohol vapor.

4. Process of preparing an alkali metal aliphatic monohydroxy alcoholate, comprising treating in a column a stream of an aliphatic monohydroxy alcoholic solution of alkali and an auxiliary liquid capable of forming an azeotropic mixture with the reaction product, with a counter stream of aliphatic monohydroxy alcohol vapor.

5. Process of preparing an alkali metal aliphatic monohydroxy alcoholate, comprising treating in a column a downward stream of an aliphatic monohydroxy alcoholic solution of alkali and an auxiliary liquid capable of forming an azeotropic mixture with the reaction product with an upward stream of aliphatic monohydroxy alcohol vapor.

6. Process of preparing sodium ethylate, comprising treating a stream of a solution of sodium hydroxide in ethyl alcohol with a counter stream of ethyl alcohol vapor.

7. Process of preparing sodium ethylate, comprising treating in a column in the presence of a suitable auxiliary liquid capable of forming an azeotropic mixture with the reaction product about 20 liters of a stream of a solution of ethyl alcohol containing 7 to 10% sodium hydroxide and a small amount of benzene with a counter stream of ethyl alcohol vapor.

8. Process of preparing sodium butylate, comprising treating a stream of a solution of sodium hydroxide in butyl alcohol with a counter stream of butyl alcohol vapor.

9. Process of preparing sodium butylate, comprising treating in a column about 50 liters of a stream of a solution of butyl alcohol containing about 10% sodium hydroxide with a counter stream of butyl alcohol vapor.

Signed at Munich, Germany, this 9th day of November A. D. 1931.

PAUL HALBIG.